2,845,466
PREPARATION OF 2,2'-BITOLYL

Benjamin Pecherer, Montclair, N. J., assignor to Hoffmann-La Roche Inc., Nutley, N. J., a corporation of New Jersey No Drawing. Application May 13, 1955
Serial No. 508,303

4 Claims. (Cl. 260—668)

This invention relates to an improved process for making 2,2'-bitolyl. The latter is a material of known utility, e. g. it can be brominated to 2,2'-bis-(bromomethyl)-biphenyl, and the latter can be converted to the adrenolytic agent (6-allyl-6,7-dihydro-5H-dibenz[c,e]azepine by known methods.

The invention provides a novel process for making 2,2'-bitolyl which comprises reducing m-tolidine tetrazonium hydroxide in alkaline medium with a lower alkanol having not more than two carbon atoms. In a comprehensive embodiment, the invention relates to a process of making 2,2'-bitolyl which comprises tetrazotizing m-tolidine, reacting the resulting tetrazonium salt with a base selected from the group consisting of calcium oxide and calcium hydroxide and mixtures thereof thereby forming m-tolidine tetrazonium hydroxide, and reducing the latter in alkaline medium with a lower alkanol having not more than two carbon atoms thereby forming 2,2'-bitolyl. This process may be illustrated graphically by the following flow sheet:

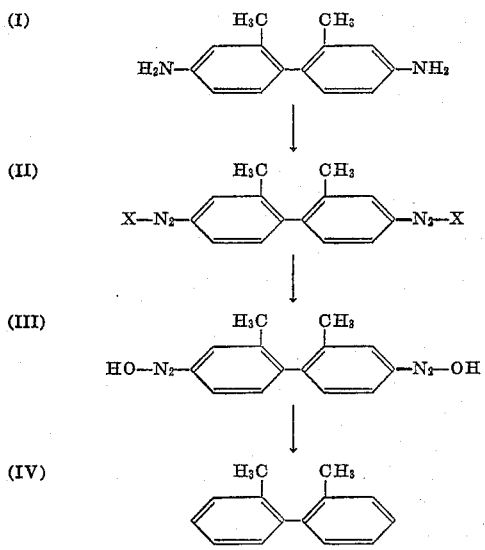

In the above flow sheet, X represents an anion of hydrochloric acid, hydrobromic acid, sulfuric acid, etc.

In the first stage of the comprehensive process described above, m-tolidine (I) is tetrazotized, by procedures known per se for this purpose, e. g. by reacting (I) in the cold with an alkali metal nitrite or an alkaline earth metal nitrite in the presence of an excess of a mineral acid which is non-oxidizing under the reaction conditions; suitable acids including, for example, hydrochloric acid, hydrobromic acid and sulfuric acid. The resulting m-tolidine tetrazonium salt (II) is not isolated, but is converted in the reaction mixture to m-tolidine tetrazonium hydroxide (III) by alkalinization of the tetrazotization reaction mixture with calcium oxide or calcium hydroxide or mixtures thereof, the basic material being added in an amount at least sufficient to neutralize the residual acidity of the tetrazotization reaction mixture and also to convert the tetrazonium salt to the corresponding tetrazonium hydroxide. An excess of the basic material is not deleterious; a slight excess is preferred. The m-tolidine tetrazonium hydroxide is not isolated but is reduced directly, in the reaction mixture, to 2,2'-bitolyl (IV) by reaction with at least two molar proportions of methanol or ethanol. Preferably the reduction step (III→IV) is combined with, and performed simultaneously with, the alkalinization step (II→III). The 2,2'-bitolyl product can be isolated by conventional procedures, for example by acidification of the reaction mixture, solvent extraction of the acidified reaction mixture, and steam distillation of the solvent extract.

A preferred embodiment of the process of the invention comprises reacting m-tolidine with sodium nitrite and aqueous hydrochloric acid thereby forming an aqueous acidic solution of m-tolidine tetrazonium chloride, reacting said solution with at least a sufficient quantity of basic material selected from the group consisting of calcium oxide and calcium hydroxide to neutralize the acidity of the solution and to convert the m-tolidine tetrazonium chloride to m-tolidine tetrazonium hydroxide, and reacting the alkalinized mixture with a lower alkanol having not more than two carbon atoms thereby forming 2,2'-bitolyl.

The invention is further disclosed in the following examples which are illustrative but not limitative thereof. Temperatures are stated in degrees centigrade.

Example 1

In a one-line beaker, set in an ice-salt bath, was placed 149 g. of m-tolidine hydrochloride (0.7 mol) and 125 ml. of concentrated aqueous HCl. The mixture was stirred until a smooth creamy paste resulted, then 250 g. of crushed ice was added. To the cold stirred suspension was added portionwise 96 g. of solid sodium nitrite over a period of 45 minutes, keeping the temperature below 5° C. As the tetrazotization proceeded, the m-tolidine hydrochloride dissolved, and when the reaction was completed, a deep amber solution resulted. This solution was carefully added, with stirring, to a boiling suspension of 75 g. of calcium hydroxide in 5 liters of anhydrous ethanol. Evolution of nitrogen occurred at once, and the heat of reaction was sufficient to maintain the mixture at reflux during the entire addition. When all of the amber solution had been added, the suspension was refluxed for an additional hour.

Excess solvent (chiefly ethanol, water and some acetaldehyde and polymers thereof) was distilled off at a temperature up to 85°. The residue was covered with water and brought to pH 2 by addition of concentrated aqueous hydrochloric acid. A dark oily layer floating on a brown aqueous solution resulted. The oil was drawn off and the aqueous layer was extracted three times with 200 ml. portions of benzene. The combined oil layer and benzene extracts were washed successively with water, saturated aqueous sodium bisulfite solution, dilute aqueous sodium hydroxide, and finally with water. The final organic layer was stripped of solvent benzene. The residual oil was distilled at 125–145° with super-heated steam, whereupon the 2,2'-bitolyl appeared in the distillate as a pale yellow oil. This oil was collected and subjected to vacuum distillation. 2,2'-bitolyl was collected in the fraction distilling at 125–127° at 14 mm. Hg.

Example 2

In a one-liter beaker, cooled with an ice-sale bath, was placed 149 g. of m-tolidine hydrochloride and 125 ml. of concentrated aqueous HCl. The mixture was stirred until a smooth creamy paste resulted, then 250 g. of crushed ice was added. To the cold stirred suspension was added portionwise 96 g. of solid sodium nitrite over a period of 30 minutes, keeping the temperature below 3°. The resulting amber solution was carefully added, with stirring, to a boiling suspension of 150 g. of calcium hydroxide in 4 liters of anhydrous methanol. Evolution of nitrogen occurred, and the heat of reaction refluxed the reaction mixture. After addition, the suspension was refluxed for ½ hour longer.

Excess solvent was distilled off at a temperature up to 60°. The residue was covered with water and brought to pH 3 with aqueous hydrochloric acid. The resulting dark oil was collected and the aqueous layer was extracted with benzene. The combined oil layer and benzene extract was washed successively with water, saturated aqueous sodium bisulfite solution, dilute aqueous sodium hydroxide, and finally with water. The benzene was then stripped, and the residual oil was distilled at 125–145° with super-heated steam. The 2,2'-bitolyl in the receiver was collected and fractionated. 2,2'-bitolyl was collected in the fraction distilling at 130–133° at 16 mm. Hg.

*Example 3*

In a one-liter beaker, set in a cooling bath, was placed 144 g. of m-tolidine hydrochloride and 125 ml. of concentrated aqueous HCl. The mixture was stirred until a smooth paste resulted, and 250 g. of crushed ice was added. To the cold stirred suspension was added in portions 93 g. of solid sodium nitrite over a period of 30 minutes, keeping the temperature below 3°. The amber solution obtained was added slowly, with stirring, to a boiling suspension of 350 g. of calcium oxide in 2 liters of anhydrous methanol. After addition of the amber solution was completed, the suspension was refluxed for 45 minutes longer.

Excess solvent was distilled off at a temperature up to 65°. The residue was covered with water and brought to pH 2 by addition of hydrochloric acid. The resulting dark oil was collected and the aqueous layer was extracted with benzene. The combined oil layer and benzene extract was washed successively with water, saturated aqueous sodium bisulfite solution, dilute aqueous sodium hydroxide, and finally with water. The organic layer thus obtained was stripped of solvent benzene. The residual oil was distilled at 125–145° with super-heated steam. The 2,2'-bitolyl in the distillate was collected, and subjected to vacuum distillation. 2,2'-bitolyl was collected in the fraction distilling at 129–135° at 15 mm. Hg.

*Example 4*

In a one-liter beaker, set in an ice-salt bath, was placed 149 g. of m-tolidine hydrochloride and 125 ml. of concentrated aqueous HCl. The mixture was stirred until a smooth creamy paste resulted, then 250 g. of crushed ice was added. To the cold stirred suspension was added portionwise 96 g. of solid sodium nitrite over a period of 1 hour, keeping the temperature below 5°. The amber solution obtained was slowly added, with stirring, to a boiling suspension of 350 g. of calcium oxide in 2 liters of anhydrous ethanol. When all of the amber solution had been added, the suspension was refluxed for 1½ hours.

Excess solvent was distilled off at a temperature up to 85°. The residue was acidified with 855 ml. of concentrated aqueous HCl. The resulting oil was taken up in benzene, separated from the aqueous layer, and washed as in Example 3. The organic layer was stripped of solvent benzene and the residual oil was distilled at 125–145° with super-heated steam. The 2,2'-bitolyl in the receiver was collected and subjected to vacuum distillation. 2,2'-bitolyl was obtained in the fraction distilling at 130–135° at 16 mm. Hg; $n_D^{24.5} = 1.5722$.

I claim:

1. A process of making 2,2'-bitolyl which comprises reducing m-tolidine tetrazonium hydroxide in aqueous alkaline solution with a lower alkanol having not more than two carbon atoms.

2. A process which comprises tetrazotizing m-tolidine in aqueous acidic medium, reacting the resulting aqueous solution of tetrazonium salt with a base selected from the group consisting of calcium oxide and calcium hydroxide and mixtures thereof thereby forming an aqueous solution of m-tolidine tetrazonium hydroxide, and reducing the latter in alkaline medium with a lower alkanol having not more than two carbon atoms thereby forming 2,2'-bitolyl.

3. A process which comprises reacting m-tolidine with sodium nitrite and aqueous hydrochloric acid thereby forming an aqueous acidic solution of m-tolidine tetrazonium chloride, reacting said solution with at least a sufficient quantity of basic material selected from the group consisting of calcium oxide and calcium hydroxide to neutralize the acidity of the solution and to convert the m-tolidine tetrazonium chloride to m-tolidine tetrazonium hydroxide, and reacting the alkalinized mixture with a lower alkanol having not more than two carbon atoms thereby forming 2,2'-bitolyl.

4. A process which comprises reacting m-tolidine with sodium nitrite and aqueous hydrochloric acid, thereby forming an aqueous hydrochloric acid solution of m-tolidine tetrazonium chloride; and adding said aqueous solution to a boiling suspension of basic material selected from the group consisting of calcium oxide and calcium hydroxide in a lower alkanol having not more than two carbon atoms, said basic material being present in excess of the quantity required to neutralize the hydrochloric acid and to convert the tetrazonium chloride to the tetrazonium hydroxide, thereby forming 2,2'-bitolyl.

References Cited in the file of this patent

Winston: Amer. Chem. J., vol. 31 (1904), pages 119–142 (pages 119–120 and 128–129 relied on).

Kornblum: "Organic Syntheses," vol. 21 (1941), John Wiley & Sons, New York (pages 30–36 relied on).

Hodgson et al.: Journal of the Chemical Society (1944), pp. 112–113.

Schmidt: "Organic Chemistry," Gurney and Jackson, London, 1950 (page 437 relied on).

Rodd: Chemistry of Carbon Compounds, vol. III(b) Aromatic Compounds, 1956, pp. 1028–1034, D. Van Nostrand Co., New York 10, New York.